United States Patent [19]

Ingalls

[11] Patent Number: 4,746,853

[45] Date of Patent: May 24, 1988

[54] BATTERY JUMPER CABLE ASSEMBLY

[76] Inventor: Roger Ingalls, 761 San Pablo Ave., Sunnyvale, Calif. 94086

[21] Appl. No.: 28,060

[22] Filed: Mar. 19, 1987

Related U.S. Application Data

[63] Continuation of Ser. No. 793,924, Nov. 1, 1985, abandoned.

[51] Int. Cl.⁴ .............................. H02J 7/00; H02J 7/10
[52] U.S. Cl. ............................................. 320/25; 320/2
[58] Field of Search ........................... 320/2, 25, 26, 54

[56] References Cited

U.S. PATENT DOCUMENTS

| | | | |
|---|---|---|---|
| 3,258,672 | 6/1966 | Godshalk et al. | 320/25 |
| 3,278,823 | 10/1966 | Ross | 320/DIG. 2 |
| 3,281,816 | 10/1966 | Raymond | 320/25 |
| 3,308,365 | 3/1967 | St. John | 320/25 |
| 3,659,183 | 4/1972 | Carlson | 320/25 |
| 4,217,534 | 8/1980 | Cole | 320/25 |
| 4,238,722 | 12/1980 | Ford | 320/25 |
| 4,463,402 | 7/1984 | Cottrell | 320/25 X |

Primary Examiner—R. J. Hickey
Attorney, Agent, or Firm—Townsend & Townsend

[57] ABSTRACT

An assembly of battery cables for use in coupling a live battery to a dead battery for engine-starting purposes. The assembly includes a circuit comprised of a solenoid which, when energized, closes a current path between two cables to thereby couple the batteries together. The solenoid is energized when a manual switch is closed and when the residual voltage of the dead battery provides a bias voltage for a circuit element in series relationship with the coil of the solenoid. In one form of the invention, the component receiving the bias voltage includes a silicon-controlled rectifier. In another embodiment of the invention, the component is comprised of a transistor, such as a Darlington transistor. The assembly includes a normally closed switch which is opened to interrupt the current flow through the coil of the solenoid when the cables are to be removed from the batteries after the engine associated with the dead battery has been started.

5 Claims, 1 Drawing Sheet

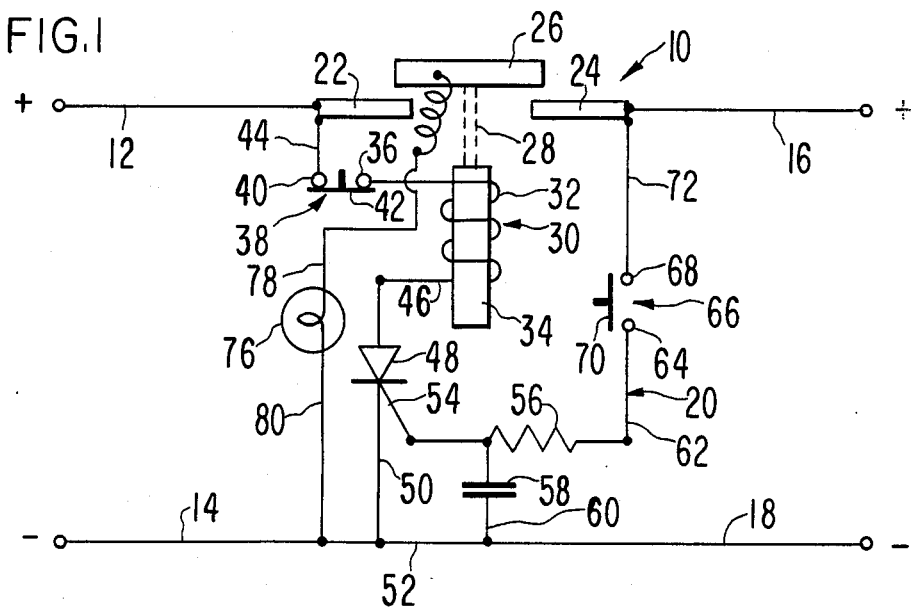
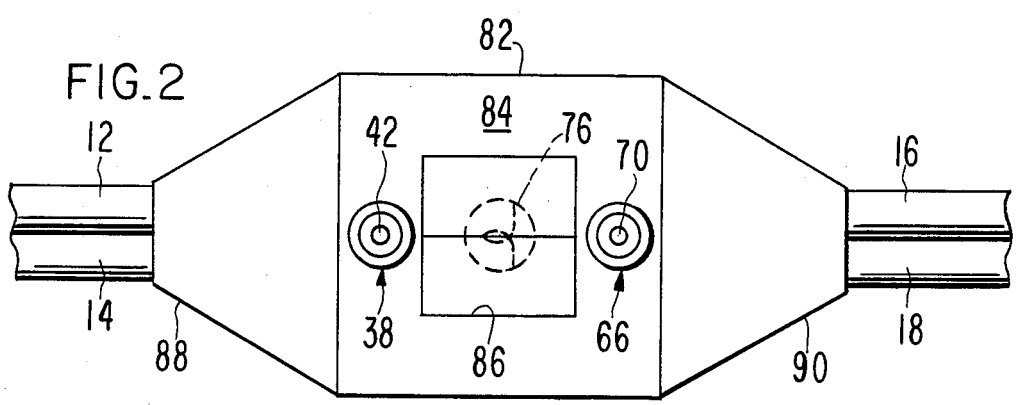
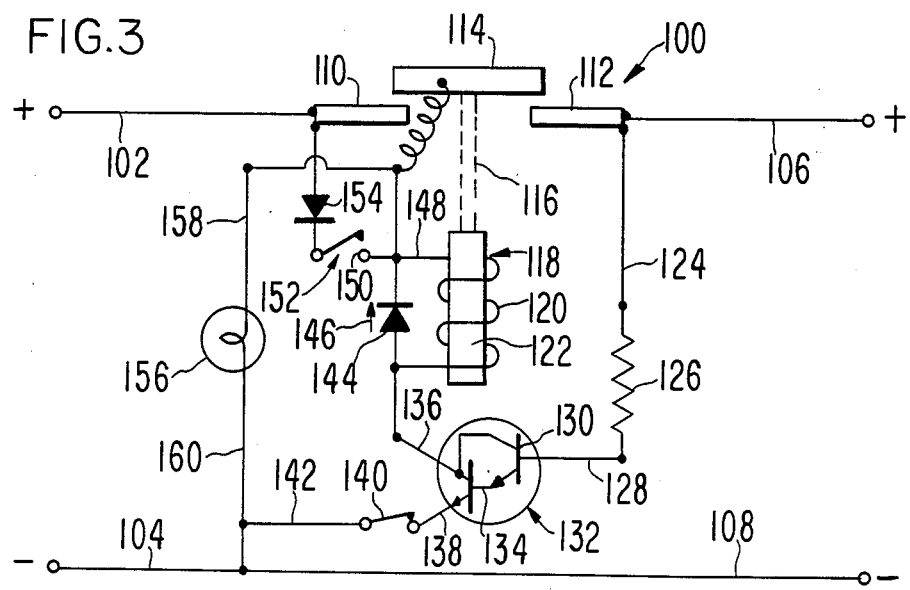

BATTERY JUMPER CABLE ASSEMBLY

This is a continuation of application Ser. No. 793,924 filed Nov. 1, 1985, now abandoned.

This invention relates to improvements in the construction of jumper cables for vehicle and other batteries and, more particularly, to an improved jumper cable assembly having improved, simplified safety features.

BACKGROUND OF THE INVENTION

The use of jumper cables for starting the engine of a vehicle having a weak or dead battery is well known. The basic jumper cable unit comprises a pair of cables having connector means at the ends thereof for attachment of the cables to the terminals of a pair of batteries, one of which is "dead." Such cables are connected directly to the battery terminals and there are no safety features associated with such cables to protect against bodily injury to the user of the cables.

When jumper cables are directly connected to the battery terminals of a pair of batteries, there have been instances in which bodily injury has occurred. In some cases, batteries have exploded because of the presence of combustible gases which are ignited when a spark is generated as one end of a cable is connected to a terminal of a live battery. As a result of such problems, safety circuitry has been included as part of a jumper cable assembly. Such circuitry is generally complex in construction and expensive to produce. As a result, such battery cable assemblies have been found unacceptable by the general purchasing public. Disclosures directed to jumper cables having safety circuits associated with them are found in the following U.S. Pat Nos.: 4,163,134, 4,166,241, 4,180,746, 4,217,534, 4,238,722, 4,272,142, 4,349,774, 4,366,430, 4,420,212, 4,463,402 and 4,488,147.

Because of the dangers of using jumper cables without safety circuitry and because jumper cables used with such safety circuitry are complex in construction and expensive to produce, a need exists for a jumper cable assembly which is simple and rugged in construction, can be used by persons with no special skills yet the assembly provides safety features against bodily injury and damage to batteries with which the assembly is to be coupled. The present invention satisfies this need.

SUMMARY OF THE INVENTION

The present invention provides a battery jumper cable assembly which is simple in construction and which has safety circuitry housed in a compact package from which two pairs of cables extend, one pair of cables adapted to be coupled to the terminals of the live battery and the other pair of cables being adapted for connection to the terminals of a "dead" battery. The circuit uses the residual voltage of the dead battery, such voltage being generally in the range of 0.5 to 1 volt or less. Such residual battery voltage is used to energize a solenoid to move a bridging bar into bridging relationship to a pair of terminals coupled to a pair of cables so as to interconnect the cables. Thus, once the bridging bar is in an operative position bridging the two terminals, the cables are coupled together to, in turn, couple the live battery to the dead battery, whereupon the engine associated with the dead battery can be started in the normal fashion. Following the starting of the engine, the circuitry can be quickly disabled so as to permit safe removal of the battery cables from the terminals of the battery without fear of bodily injury to the user of the cables.

The primary object of the present invention is to provide an improved jumper cable assembly for coupling a dead battery with a live battery wherein an improved circuit forming part of the assembly uses residual voltage from the dead battery for energizing a solenoid which in turn closes a current flow path between a pair of cables, thereby coupling the live battery with the dead battery and permitting an engine associated with the dead battery to be started, all of which can be accomplished with circuitry of simple and rugged construction and formed of a relatively few number of commercially available parts.

Other objects of this invention will become apparent as the following specification progresses, reference being had to the accompanying drawing for an illustration of the invention.

IN THE DRAWING

FIG. 1 is a schematic view of a first embodiment of the battery jumper cable assembly of the present invention;

FIG. 2 is a fragmentary, top plan view of the jumper cable assembly, showing the housing in which the circuit of the assembly is located; and FIG. 3 is a view similar to FIG. 1 but showing a second embodiment of the jumper cable assembly of the present invention.

A first embodiment of the jumper cable assembly of the present invention is shown in FIG. 1 and is broadly denoted by the numeral 10. Assembly 10 includes a first pair of jumper cables 12 and 14 which are adapted to be coupled to a live battery, i.e., the battery which is to be used to supply the voltage to a dead battery. Assembly 10 further includes a second pair of jumper cables 16 and 18 which are adapted to be coupled to the terminals of a dead battery or a battery which has a very low output voltage. Cables 14 and 18 are directly connected to each other by a lead 52.

A circuit broadly denoted by the numeral 20 is coupled to cables 12, 14, 16 and 18, and circuitry 20 includes a pair of bar-like terminals 22 and 24 which are normally spaced apart and are coupled with respective cables 12 and 16 as shown in FIG. 1. A bridging bar 26 of metallic material is coupled by a rod 28 to a solenoid 30 having a coil 32 wound on a tabular core 34. The solenoid has a spring (not shown) which normally biases bridging bar 26 away from terminals 22 and 24 as shown in FIG. 1. When the solenoid is actuated, rod 28 is drawn into the core 34 and causes bridging bar 26 to be in bridging relationship to terminals 22 and 24, thereby closing an electrical path between and interconnecting cables 12 and 16.

One end of coil 32 is coupled to one terminal 36 of a normally closed, push-button switch 38 having a second terminal 40, terminals 36 and 40 being bridged normally by a push-button plunger 42. A lead 44 couples terminal 40 with terminal 22.

The opposite end of coil 32 is coupled by a lead 46 to a silicon-controlled rectifier (SCR) 48. The opposite side of SCR 48 is coupled by a lead 50 to a lead 52 common to cables 14 and 18. SCR 48 has a gate to which a lead 54 is coupled, lead 54 also being coupled to one side of a resistor 56 and to one side of a capacitor 58 coupled by a lead 60 to lead 52.

The opposite side of resistor 56 is coupled by a lead 62 to one terminal 64 of a normally closed, push-button switch 66 having a second terminal 68 and a bridging member 70. Terminal 68 is coupled by a lead 72 to terminal 24.

A light bulb 76 is coupled by lead 78 to bridging bar 26. A lead 80 couples the other side of bulb 76 with common lead 52. The bulb is energized when bridging bar 26 engages terminals 22 and 24.

Circuit 20 as described with respect to FIG. 1 is enclosed in a housing 82 (FIG. 2) which is of plastic or other suitable electrically non-conductive material. The housing has a flat outer surface 84, and switches 38 and 66 are mounted on the housing near face 84 so that the push-buttons 42 and 70 thereof are accessible. The housing further has a hole or opening 86 which allows viewing of the light from bulb 76. Cables 12 and 14 project outwardly from one end 88 of housing 82, and cables 16 and 18 project outwardly from the opposite end 90 of the housing.

In operation, terminals 16 and 18 are first connected to the positive and negative terminals, respectively, of the dead battery, and cables 12 and 14 are coupled to the positive and negative terminals of the live battery charging current. Switch 38 is normally closed and switch 70 is normally open. Moreover, the dead battery typically has a small voltage across its terminal and the operation of assembly 10 depends upon this small voltage which may be in the range of 0.5 to 1 volt or less. Such small voltage is sufficient to trigger the SCR 48 to render it electrically conductive.

When it is desired to actuate assembly 10, push-button switch 70 is closed, forming a closed path for the flow of current through components as follows: the positive terminal of the dead battery, line 16, line 72, switch 70, line 62, resistor 56, capacitor 58, line 60, cable 18 and the negative terminal of the dead battery. The moment the switch 70 is closed, the capacitor 58 is charged to a certain voltage, namely the voltage of the dead battery. This voltage appears at the junction between resistor 56 and capacitor 58 and is applied by lead 54 to SCR 48, causing it to latch and to conduct so that a current will flow along a following path: the positive terminal of the live battery, cable 12, line 44, switch 38, coil 32, line 46, SCR 48, line 50, cable 14 and the negative terminal of the live battery. When coil 32 is energized, rod 28 is pulled into core 34, causing bar 26 to bridge the gap between terminals 22 and 24, thereby closing the path between cables 12 and 16 and allowing the dead battery to be directly coupled to the live battery for starting the engine of the vehicle with which the dead battery is associated.

After the engine has been started, the push button of switch 38 is actuated to open the switch and interrupt the current path through the coil 32, whereupon solenoid 30 is de-energized, and bar 26 is moved away from terminals 22 and 24 opening the current path between cables 12 and 16. Then, the cables can be removed from the batteries. During the time when bar 26 bridges terminals 22 and 24, a current flows through bulb 76, causing it to emit light, thereby indicating that the engine of the dead battery can safely be started. When bar 26 moves out of engagement with terminals 22 and 24, the bulb 76 is extinguished.

An alternate embodiment of the assembly of the present invention shown in FIG. 3 is broadly denoted by the numeral 100 and includes cables 102, 104, 106 and 108 coupled to the terminals of a live battery and a dead battery, respectively. A pair of bar-like terminals 110 and 112 are coupled to cables 102 and 106, respectively, and a bridging bar 114 is movable into and out of bridging relationship to terminals 110 and 112, bar 114 being coupled to one end of a spring-biased rod 116 of a solenoid 118 having a coil 120 and a core 122. A lead 124 couples one end of a resistor 126 to terminal 112, the opposite end of the resistor 126 being coupled by a lead 128 to a first input gate of a Darlington transistor 132, whose emitter is coupled by a lead 136 to coil 120 and whose collector is coupled by a lead 138 to a normally closed switch 140 coupled by a lead 142 to cable 104. A diode 144 is coupled across the coil for flow of current in only one direction, namely the direction of arrow 146 (FIG. 3), the coil being coupled by a lead 148 to a terminal 150 of a normally open switch 152 which is coupled by a diode 154 to terminal 110. A light bulb 156 is coupled by a lead 158 to bridging bar 114 and a lead 160 to cable 104.

In operation, switch 140 is normally closed and switch 152 is normally open. The dead battery has a residual voltage, such as 0.5 to 1 volt or less and such voltage provides a bias for base 130 of transistor 132. This causes the output section of the transistor 132 to be conductive. However, there will be no current flow through the coil 120 since diode 144 bypasses the coil and forms a short-circuit path to same.

When switch 152 is closed, a current flow passes through the following components: the positive terminal of the live battery, cable 102, diode 154, switch 152, lead 148, coil 120, lead 136, transistor 132, lead 138, switch 140, lead 142 and cable 104 to the negative terminal of the live battery. When this flow occurs, solenoid 118 is actuated to pull bar 114 into bridging relationship to terminals 110 and 112, whereupon the cables 102 and 106 are interconnected so that the dead battery is now coupled to the live battery and the engine associated with the dead battery can then be started. After the engine has been started, switch 140 is opened, thereby breaking the circuit including the coil 120, whereupon bar 114 is moved away from terminals 110 and 112 and the cables can then be safely removed from the batteries.

A number of safety features are associated with the present invention as embodied in assemblies 10 and 100. A main safety feature is provided by the present invention because the user of either assembly 10 or assembly 100 is far enough away from both batteries when using the assembly to avoid being injured. Any arcing will be contained with the housing containing the circuitry of the invention and not at the terminals of the two batteries. The invention will not operate unless the cables are connected properly. In this respect, the present invention is also an electrical systems protection device.

The housing of assembly 10 or assembly 100 has sufficient surface area to mount warning decals or other labels. The present invention cannot be accidentally left on for the next use. Moreover, the invention can be made inexpensively as compared with the cost of manufacture of prior art devices.

I claim:

1. A jumper cable assembly for connecting a live battery with a dead battery having a residual voltage thereon comprising:

a first pair of jumper cables adapted to be releasably coupled to and to extend outwardly from the terminals of the live battery;

a second pair of jumper cables adapted to be releasably coupled to and to extend outwardly from the terminals of the dead battery, one of the cables of the first pair being coupled directly to one of the cables of the second pair, the other cables of the first and second pairs being spaced apart;

actuatable means movable into and out of bridging relationship to said other cables for electrically interconnecting said other cables, whereby the batteries willl be coupled together; and means responsive to the residual voltage of the dead battery and coupled with said interconnecting means for selectively moving the same into said bridging relationship, said moving means including a silicon controlled rectifier having a gate, a solenoid coupling the silicon controlled rectifier across the live battery, said solenoid being coupled to said actuatable means for actuating the same when the silicon controlled rectifier is conductive, and switch means coupled with the gate of said silicon controlled rectifier and one of said second cables for only momentarily applying the voltage of the dead battery to the gate of said silicon controlled rectifier to cause conduction of current therethrough.

2. An assembly as set forth in claim 1, wherein said internconnecting means includes a bridging bar, there being a capacitor in series with the switch means, said capacitor adapted to be charged by the dead battery when the switch means is closed, said gate being coupled with said capacitor.

3. An assembly as set forth in claim 2, wherein said interconnecting means and said moving means are in a housing, there being a first switch on the housing for energizing the solenoid and a second switch on the housing for opening the circuit to the solenoid.

4. An assembly as set forth in claim 2, wherein said switch being a normally open switch, and including a normally closed switch, said normally open switch being closed to energize the coil of the solenoid, said normally closed switch being opened to de-energize the coil of the solenoid.

5. A jumper cable assembly for connecting a live battery with a dead battery having a residual voltage thereon comprising:

a first pair of jumper cables adapted to be releasably coupled to and to extend outwardly from the terminals of the live battery;

a second pair of jumper cables adapted to be releasably coupled to and to extend outwardly from the terminals of the dead battery, one of the cables of the first pair being coupled directly to one of the cables of the second pair, the other cables of the first and second pairs being spaced apart;

a bridging bar movable into and out of bridging relationship to said other cables for electrically interconnecting said other cables, whereby the batteries will be coupled together;

means responsive to the residual voltage of the dead battery and coupled with said bridging bar for selectively moving the same into said bridging relationship, said moving means including a silicon controlled rectifier having a gate, a solenoid coupling the silicon controlled rectifier across the live battery, said solenoid being coupled to said actuatable means for actuating the same when the silicon controlled rectifier is conductive, and switch means coupled with the gate of said silicon controlled rectifier and one of said second cables for applying the voltage of the dead battery to the gate of said silicon controlled rectifier to cause conduction of current therethrough, there being a capacitor in series with the switch means, said capacitor adapted to be charged by the dead battery when the switch means is closed, said gate being coupled with said capacitor; and a light source coupled to the bridging bar and to said one cable of the first pair of cables, said light source being energized when said bridging bar moves said bridging relationship.

* * * * *